United States Patent [19]

Peter et al.

[11] 4,310,321
[45] Jan. 12, 1982

[54] CONTROLLABLE DRIVE FOR THE AUXILIARY AGGREGATES OF INTERNAL COMBUSTION ENGINES, ESPECIALLY OF MOTOR VEHICLE INTERNAL COMBUSTION ENGINES

[75] Inventors: Wolfgang Peter; Hans Hanke, both of Stuttgart, Fed. Rep. of Germany

[73] Assignee: Daimler-Benz Aktiengesellschaft, Stuttgart, Fed. Rep. of Germany

[21] Appl. No.: 924,720

[22] Filed: Jul. 14, 1978

[30] Foreign Application Priority Data

Jul. 16, 1977 [DE] Fed. Rep. of Germany ....... 2732279

[51] Int. Cl.³ ............................................. F16H 55/52
[52] U.S. Cl. ........................................ 474/14; 474/46
[58] Field of Search ............ 74/230.17 R, 230, 17 E; 192/105 C

[56] References Cited

U.S. PATENT DOCUMENTS

| | | | |
|---|---|---|---|
| 2,795,962 | 6/1957 | Vher | 74/230.17 E |
| 3,777,583 | 12/1973 | Talbot | 74/230.17 E |
| 3,975,964 | 8/1976 | Adams | 74/230.17 E X |
| 4,094,204 | 6/1978 | Yamamoto et al. | 74/230.17 E |
| 4,147,068 | 4/1979 | Woolard et al. | 74/230.17 E |

FOREIGN PATENT DOCUMENTS

| | | | |
|---|---|---|---|
| 1220693 | 7/1966 | Fed. Rep. of Germany..... | 74/230.17 E |
| 2535513 | 2/1976 | Fed. Rep. of Germany ... | 74/230.17 E |

*Primary Examiner*—Wm.Carter Reynolds
*Attorney, Agent, or Firm*—Craig and Antonelli

[57] ABSTRACT

An adjustable drive for auxiliary aggregates of internal combustion engines in which some auxiliary aggregates such as the fan are adapted to be driven from the crankshaft of the internal combustion engine by way of an adjustable V-belt drive automatically regulatable under the influence of the centrifugal force in such a manner that at smaller crankshaft rotational speeds, a transmission with a speed-up results whereas at higher crankshaft rotational speeds a transmission with a speed reduction results; the control range of the V-belt drive is thereby subdivided at least into two partial ranges by a corresponding matching of the lever arms of the flyweights and/or of the spring forces, respectively, of the spring forces themselves, between which lies a range with constant transmission ratio.

20 Claims, 5 Drawing Figures

CONTROLLABLE DRIVE FOR THE AUXILIARY AGGREGATES OF INTERNAL COMBUSTION ENGINES, ESPECIALLY OF MOTOR VEHICLE INTERNAL COMBUSTION ENGINES

The present invention relates to a regulatable drive for auxiliary aggregates of internal combustion engines, especially of motor vehicle internal combustion engines.

Regulatable drives for the auxiliary aggregates of internal combustion engines in which at least some auxiliary aggregates such as the fan are adapted to be driven from the crankshaft of the internal combustion engine by way of a V-belt drive automatically regulatable under the influence of the centrifugal force in such a manner that a speed-up takes place at a low crankshaft rotational speed and a speed-reduction takes place at a high crankshaft rotational speed are known in the art, for example, by the German Offenlegungsschrift No. 24 23 746, filed in the name of the assignee of the instant application. However, difficulties result in connection therewith, which stem from the different types and characteristics of the auxiliary aggregates, respectively, from the requirements of these auxiliary aggregates.

In most cases, fans, alternators and water pumps are to be driven by such regulatable drives; however, frequently still further aggregates must be added to this list, such as air-conditioning compressor and servo-steering pump or similar aggregates. Most aggregates require in the lower engine rotational speed range, higher rotational speeds, i.e., a transmission with a speed-up between the rotational speed of the crankshaft and that of the aggregates themselves, above all such a speed-up transmission would be important for the alternator. However, this would also be advantageous for the fan, for the air-conditioning compressor and for the servo-steering pump, and at least would not be disadvantageous for the water pump. Starting from the lower engine rotational speed range, in which the speed-up transmission would have to be largest, the transmission could be changed already after reaching a predetermined aggregate rotational speed—which would correspond to a certain rotational speed of the crankshaft—in such a manner that a constant output rotational speed of the aggregate drive would result with an increasing engine rotational speed. This would produce with the alternators of present-day design substantially constant current output, would assure a sufficient functioning with the air-conditioning compressor and would lead with the servo-steering pumps to a smaller structural size compared to the present-day series constructions. A considerable amount in driving power for the aggregates could then be saved at higher engine rotational speed.

This, however, is true only for the aforementioned aggregates. Thus, for example, the conditions with the fan and in part also with the water pump are different. More particularly, it has been found that above all of the fan further increasing demands have to be made of the action and effect of the radiator fan up to considerably higher engine rotational speeds in order to be able to fulfill, for example, during uphill drives in mountainous terrain, present-day traffic requirements also under more difficult conditions. In principle, this consideration is also valid for the water pump. Consequently, a regulation to a constant output rotational speed with the aforedescribed early commencement is not permissible for these aggregates.

If, on the other hand, one would then select the regulation beginning at such a high engine rotational speed as has been mentioned hereinabove, whereby also fan and water pump would suffice in their functioning, then one would have to give away considerable gain possibilities in power within the middle engine rotational speed range. The two requirements—which result from the different characteristics and from the different demands on the auxiliary aggregates—are therefore not harmonizable with each other without difficulty.

The present invention is now concerned with the task to find a solution which satisfies the described requirements and which thereby produces as much as possible a saving in power. The underlying problems are solved with the drives of the aforementioned type in that the control range of the V-belt drive is subdivided by corresponding matching of the lever arms of the flyweights and/or of the spring forces, respectively, of the spring forces themselves into two partial ranges, between which lies a range of constant transmission ratio. The present invention thereby prefers a solution according to which the first partial range of the control commences to be effective approximately at one-third of the maximum crankshaft rotational speed while the second partial range of the control commences to be effective approximately at two-thirds of the maximum crankshaft rotational speed; the first partial range of the regulation thereby adjusts from the provided transmission with a speed-up to a transmission of about 1:1 while the second partial range of the regulation adjusts from the transmission of about 1:1 to the provided transmission with a speed reduction. In the foregoing, primarily engines were considered, whose maximum rotational speed lies approximately at 6,000 r.p.m. If, in contrast thereto, engines with considerably higher rotational speeds are involved, then the corresponding partial ranges slide further down. If, on the other hand, engines are involved which have a smaller rotational speed, then the corresponding partial ranges slide further up, and more particularly the second partial range slides further up so that, for example, with diesel engines, it may reach practically up to the maximum engine rotational speed.

It is already known in the art, for example, from the German Offenlegungsschrift No. 21 45 243 of the assignee of the present application, to subdivide the control range several times by means of a hydrostatic drive. However, this represents a quite complicated solution which is not realizable without difficulties with the simple means that are demanded for cost reasons in the motor vehicle construction. The task can be solved according to the present invention in an economic manner only by means of an adjustable V-belt drive which is known as such. For example, the German Auslegeschrift No. 1, 220, 693 is representative of such adjustable V-belt drives. However, in this last-mentioned Auslegeschrift, the flyweights are engageable in several steps. The disengagement—i.e., the range shifting, so to speak of—takes place therein electromagnetically, which again means a quite considerable additional shifting expenditure.

It is possible in principle to realize the inventive concept by a two- or multi-stage spring force. However, the present invention prefers a specific adjusting arrangement, according to which the flyweights act on an adjustable V-belt pulley by means of separate transmission devices against a spring force, and in this connection at first a smaller and then a larger distance from the flyweight pivot axis becomes effective between each flyweight and its coordinated transmission device. For that purpose, a pin is non-rotatably flanged onto the end of the crankshaft or is formed by the latter, which non-rotatably and axially immovably receives the non-movable V-belt pulley part of the adjustable drive and possibly still further non-adjustable V-belt pulleys and which further carries the movable V-belt pulley part on a displacement sleeve. A constructively simple solution results in this manner which can be manufactured and assembled in a simple manner and which makes attainable completely automatically the desired characteristics. The adjusting drive can thereby be also accommodated in an advantageous manner within a housing which then in its turn forms the fixed V-belt pulley of the adjustable drive and eventually still other V-belt pulleys.

With this embodiment, a construction for the spring force is proposed by the present invention, according to which the movable V-belt pulley part accommodates in its hub part a spring which is supported, on the one hand, at an offset of the pin and, on the other, internally at the bottom of the housing-like constructed hub part.

A countersleeve may be provided thereby at the offset of the pin which engages into the hub part and which covers off the spring against the outside. In this manner, the spring is accommodated protected on all sides.

If, up to now, only the use of two effective distances in the connection between flyweight and transmission device has been mentioned, then it should be pointed out that the principle according to the present invention extends also to more control ranges. Additionally—as already indicated—one may operate additionally or alone also with springs of different prestress which come into operation sequentially. As a result thereof, the same subdivision of the entire control range can be achieved.

The present invention also proposes a specific construction, according to which each flyweight is connected by way of two drag connections with its transmission device which, in its turn, is pivotally connected externally at the bottom of the hub part, and in that initially for the first partial range of the regulation, a first drag connection together with the associated spring force characteristic produces a small torque to be easily overcome by the centrifugal force moment, whereas a second drag connection together with the coordinated spring force characteristic produces a larger torque to be overcome with considerably greater difficulty by the centrifugal force moment. Moreover, the present invention proposes a transversely disposed pivot shaft arranged in the pin, which receives two flyweights, each of which includes fork-like a transmission device that is pivotally connected externally at the bottom of the hub part of the adjustable V-belt pulley. This solution is very simple from a constructive and manufacturing point of view. As regards the construction of the flyweights themselves, the present invention proposes two possibilities which both result in a simplified manufacture and stocking, whereby in the second case a more simple assembly is added because no special attention is required any longer for the installation of the flyweight in a particular position.

Accordingly, it is an object of the present invention to provide a controllable drive for the auxiliary aggregates of internal combustion engines, especially of motor vehicle internal combustion engines, which avoids by simple means the aforementioned shortcomings and drawbacks encountered in the prior art.

Another object of the present invention resides in a regulatable drive for the auxiliary aggregates of internal combustion engines, especially of motor vehicle internal combustion engines, which optimizes the efficiency of such drives without unnecessary waste of driving energy.

A further object of the present invention resides in a controllable drive for the auxiliary aggregates of internal combustion engines which dispenses with the necessity to give up considerable gains in power, particularly within the middle engine rotational speed range, for driving the auxiliary aggregates, yet assures optimum operation of the individual aggregate taking into consideration the demands made of the same at different engine rotational speeds and driving conditions of the vehicle.

A still further object of the present invention resides in a regulatable drive for the auxiliary aggregates of internal combustion engines which harmonizes the contradictory requirements resulting from the different characteristics and different demands of the auxiliary aggregates as regards high efficiency and proper operation of each auxiliary aggregate.

Still another object of the present invention resides in an adjustable drive of the type described above which is simple in construction, easy to manufacture and assemble and reliable in its operation.

These and other objects, features and advantages of the present invention will become more apparent from the following description when taken in connection with the accompanying drawing which shows, for purposes of illustration only, one embodiment in accordance with the present invention, and wherein.

Figure 1:
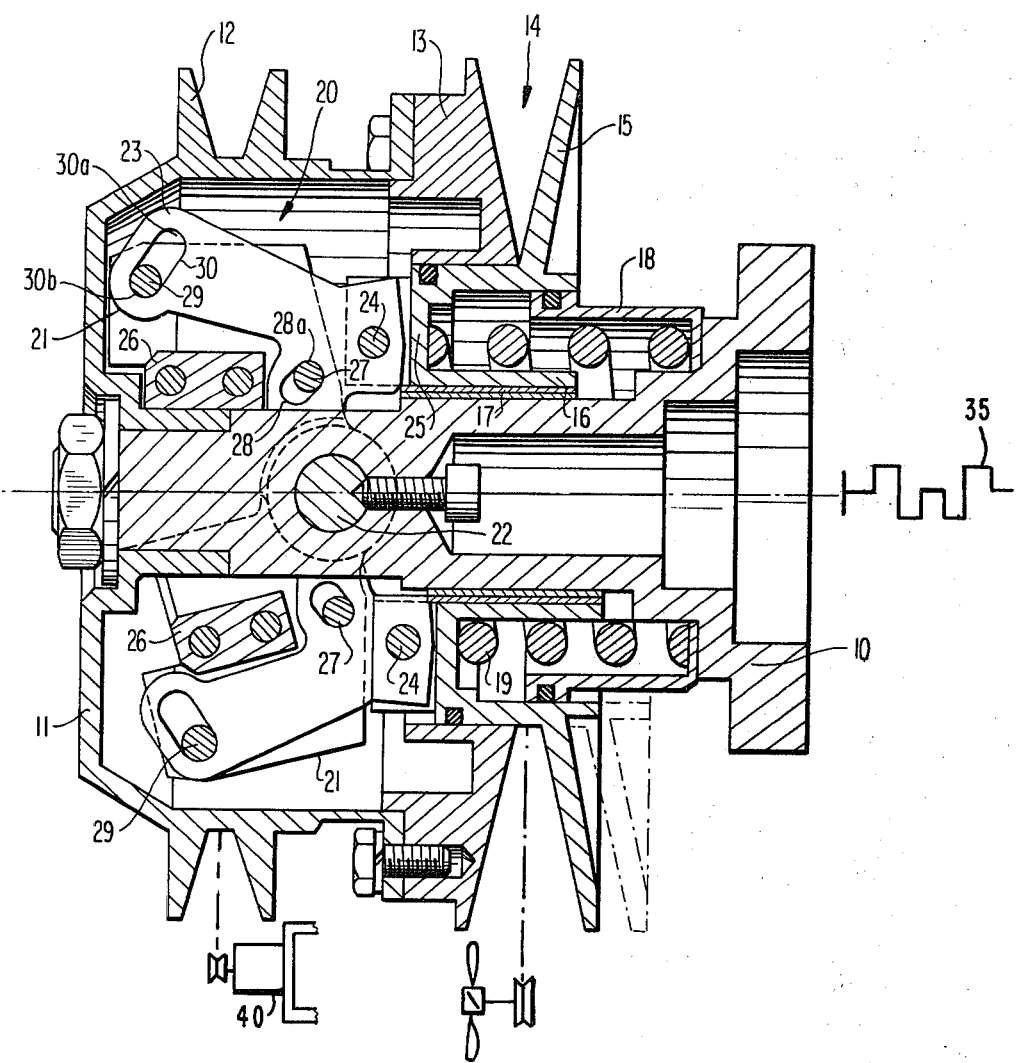
FIG. 1 is a longitudinal cross-sectional view through a regulatable V-belt drive for auxiliary aggregates of internal combustion engines in accordance with the present invention, illustrating in the upper part of the drawing the flyweights in the starting position and in the lower part thereof the flyweights in an intermediate position.

Referring now to the drawing wherein like reference numerals are used throughout the various views to designate like parts, according to FIG. 1 a stub shaft 10 is flangedly connected at the end of the crankshaft schematically represented in FIG. 1 by numeral 35 pointing toward the radiator, i.e., therefore for the most part at the forward end; a housing-like part 11 with an integral V-belt pulley 12 is arranged at the forward end of the stub shaft 10 as to be therewith but not relative thereto. The fixed V-belt pulley part 13 of the adjustable V-belt drive generally designated by reference numeral 14 is secured to the housing part 11 at the rear end thereof, whose axially movable V-belt pulley part 15 is supported with its hub portion 16 on the stub shaft 10 by means of a slide sleeve 17. The hub portion 16 is constructed housing-like. It is completed into a closed housing by a sleeve 18 engaging into the same, in which the spring 19 is arranged. The spring 19 keeps the adjustable V-belt pulley part 14 in the position illustrated in the upper half of FIG. 1. It is prestressed to a predetermined spring force and can be overcome by the adjusting mechanism to be described more fully hereinafter only when a predetermined speed is reached.

Figure 3:
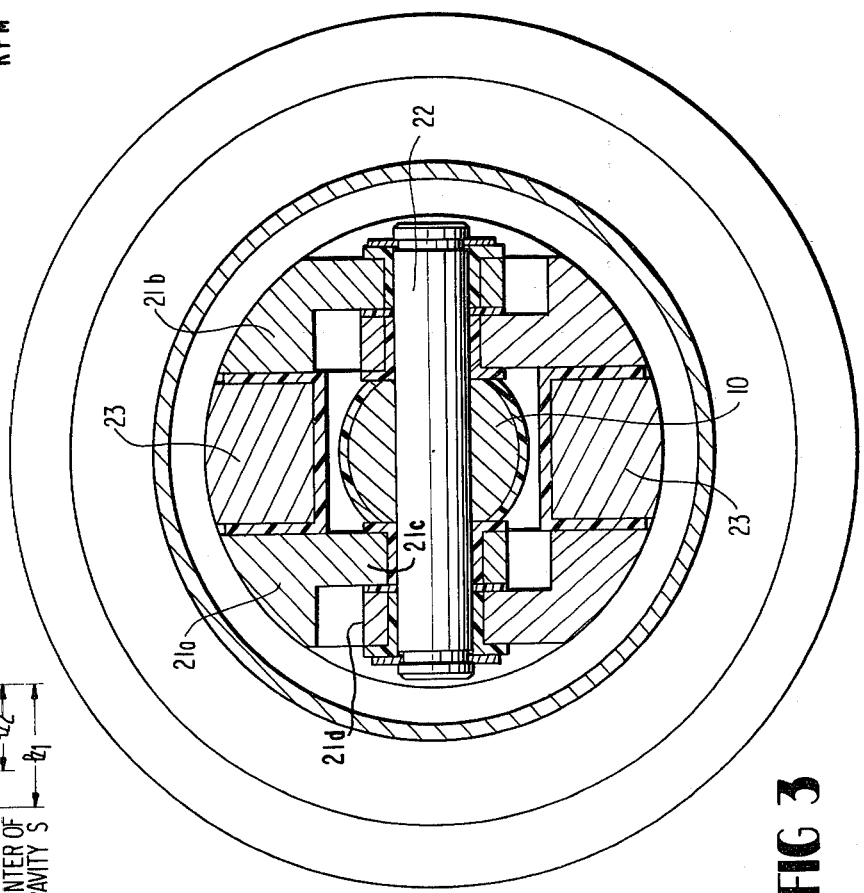
FIG. 3 is a cross-sectional view through the pivotal connection of the flyweights at the pivot shaft.

The adjusting mechanism generally designated by reference numeral 20 which is accommodated in the housing part 11 is formed by two flyweights 21 which—disposed opposite one another—are pivotally connected at a cross pin 22 arranged in the stub shaft 10. This cross pin 22 forms the pivot shaft (pivot axis) for the flyweights 21. Each flyweight 21 cooperates with a transmission device 23 which is pivotally connected by means of a pin 24 in an eye at the bottom 25 of the hub portion 16 of the displaceable V-belt pulley part 15. The arrangement is thereby made in such a manner that according to FIG. 3 each flyweight 21 consists of two parts 21a and 21b which both are rigidly connected with each other by a bridging part 26 (see FIG. 1). The two flyweight parts 21a and 21b are disposed on both sides of the transmission device 23 in a mirror-image-like manner, whereby the arrangement is made in such a manner (see FIG. 3) that the eye 21c of the part 21a is disposed adjacent the stub shaft 10 whereas the eye 21d of the other part 21b is spaced at a distance from this stub shaft 10 corresponding to the width of part 25c, while the reverse arrangement exists at opposite side of stub shaft 10. In this manner, both flyweights are identical with one another and can be installed after a rotation through 180° to one another, so to speak of.

Figure 1A:
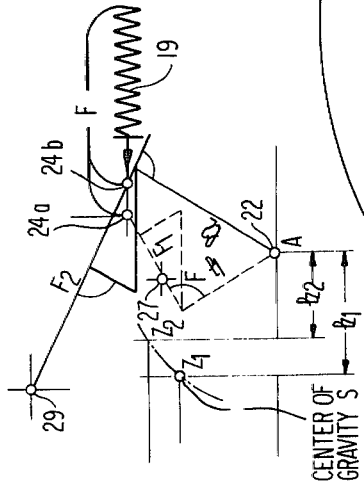
FIG. 1a is a schematic view illustrating the lever arms of the two connections as used in FIG. 1.

Each flyweight 21 has two drag or lost-motion connections with respect to the coordinated transmission device 23, which are located at different distances in relation to the pivot axis (pivot shaft) and have different distances to the line of action of the spring 19 and which come into operation sequentially. The first of these drag connections is formed by a bolt 27 (FIG. 1) connecting two flyweight parts, which so engages into an elongated aperture 28 at the transmission device 23 that it abuts at the forward edge 28a of this elongated aperture 28, as viewed in the movement direction of the flyweights. According to FIG. 1a, this first drag or lost-motion connection forms with its line of action of the spring force component $F_1$ a moment $M_{F1} = F_1 \cdot l_1$ which is overcome beginning with a predetermined rotational speed by the moment of the centrifugal force $M_{Z1} = Z_1 \cdot l_{Z1}$. The second drag or lost-motion connection is formed by a similar further outwardly disposed bolt 29 which again engages into an elongated aperture 30 at the transmission device 23, and more particularly inversely as with the first drag connection, i.e., it abuts in the illustrated position at the rear edge 30b of the elongated aperture 30. The arrangement is made in such a manner that with the second drag connection, the bolt 29 abuts at the forward edge 30a of the elongated aperture 30, when the pin 27 lifts from the forward edge 28a in the first drag connection. This means, at this point the force transmission between the flyweight and the transmission device passes over from the first to the second drag connection. The second drag connection forms, according to FIG. 1a with the coordinated line of action of the spring force component $F_2$, the moment $M_{F2} = F_2 \cdot l_2$ which is overcome only beginning with a certain higher rotational speed by the moment of the centrifugal force $M_{Z2} = Z_2 \cdot l_{Z2}$.

Figure 4:
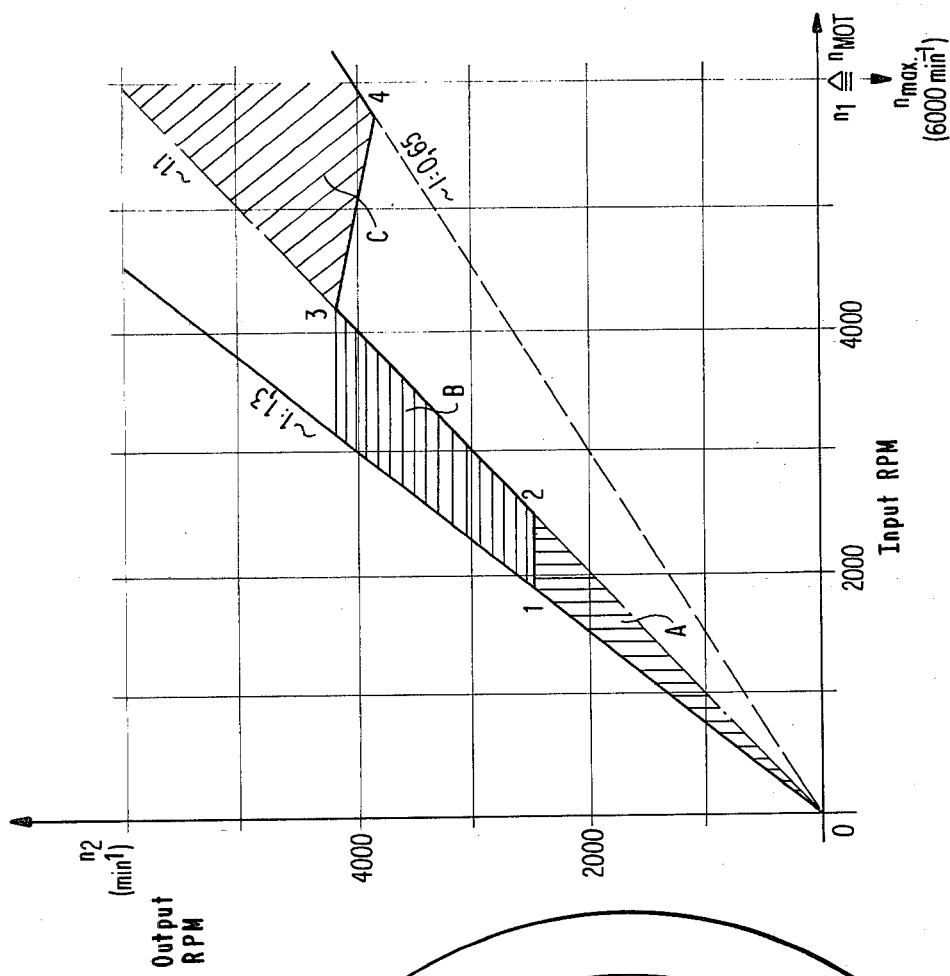
FIG. 4 is a control diagram explaining the operation of the arrangement in accordance with the present invention.

In the upper half of FIG. 1, the V-belt drive is illustrated in its position for a transmission with a speed-up, i.e., for the low rotational speed range of the driving engine. This range is illustrated in the diagram of FIG. 4 by the line section 0–1 and wherein the abscissa represents the input ($n_1$) in revolutions/minute and the ordinate represents the output ($n_2$) in revolutions/minute. In this range, the adjusting drive remains in its speed-up position, i.e. with increasing crankshaft speeds, the aggregates are driven with a transmission providing a speed-up and progressively increasing output speeds, as shown. Compared to the transmission 1:1, a zone A (FIG. 4) results in which the aggregates have an improved functioning, which extends in particular to the alternator 40. The prestress of the spring 19 and the matching of the lever arms at the flyweights are so determined that the adjustable drive remains within this range up to the point where at least the alternator 40 has reached its full output. This is customarily the case at approximately 2,000 to 2,500 r.p.m. If this point is reached, then the flyweights 21 pivot slowly outwardly and take along the transmission devices 23 by way of the first drag or lost-motion connection 27/28. The transmission devices 23 displace by means of the bolt 24 the axially movable V-belt pulley part 15 with its hub portion in such a manner that the belt passes over further toward the inside, i.e., approximately up to a transmission ratio of 1:1. This range is illustrated in FIG. 4 by the line section 1–2. This position is reached when the flyweights 21 have assumed the position illustrated in the lower part of FIG. 1. The position of the V-belt pulley part 15 can also be well-recognized in the lower part of FIG. 1.

At this point, the force transmission between the flyweights and the transmission device now passes over onto the second drag connection—as can also be recognized well from the lower part of FIG. 1—in that the flyweights 21 now take along the transmission devices 23 by means of their pins 29 whereas the pins 27 now move freely in the elongated aperture 28. This change has initially as a consequence that the moment no longer suffices in order to further displace the adjustable V-belt pulley part 15. The adjustable drive therefore remains in the now adjusted transmission of 1:1 up to a considerably higher rotational speed which is illustrated in the diagram of FIG. 4 by the line section 2–3. A range B results thereby, in which compared to a control drive with a fixed regulating range, power is economized and also the noise development is smaller.

Figure 2:
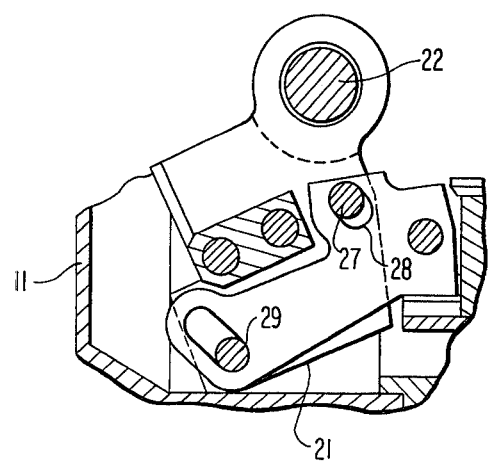
FIG. 2 is a partial longitudinal cross-sectional view, corresponding to FIG. 1 and illustrating the flyweights in their end position.

Only at the higher rotational speed the moment at the flyweights together with the other lever arms then again suffices in order to overcome again the spring 19. During the further increase of the crankshaft rotational speed, consequently the flyweights move further outwardly and continue to displace in the already described manner also the movable V-belt pulley part 15 further in the same direction, i.e., the V-belt slides ever more downwardly and the transmission passes over into a speed-reduction, such that with continued increasing crankshaft rotational speeds, a speed-reduction and progressively decreasing output speeds result, as shown. This control range is illustrated in the diagram of FIG. 4 by the line section 3–4. It can be seen that also in this case a range C is present, in which power is economized and the occurring noise is reduced. The end position is illustrated in FIG. 2. The flyweights 21 thereby abut externally and in the first drag or lost-motion connection, the pin 27 has now used up its free movement in the elongated aperture 28. The movable V-belt pulley part 15 assumes in this position the position illustrated in dash lines in the lower part of FIG. 1.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An adjustable drive for auxiliary aggregates of internal combustion engines, in which at least some auxiliary aggregates are operable to be driven from the crankshaft of the internal combustion engine by way of a V-belt drive means automatically regulatable under centrifugal force interaction essentially in such a manner that at smaller and increasing crankshaft rotational speeds a transmission with a speed-up and progressively increasing output speeds results whereas at larger and increasing crankshaft rotational speeds a transmission with a speed-reduction and progressively decreasing output speeds results, characterized in that the regulating range of the V-belt drive means is subdivided into two partial load ranges, and in that a substantially constant transmission ratio lies between said two partial load ranges.

2. A drive according to claim 1, comprising movable flyweight means for adjusting relative rotational speed transmitted from the crankshaft to the auxiliary aggregates, lever arms connecting said flyweight means to a shaft, and spring means mounted to apply a force in opposition to movement of said flyweight means, said spring means applied force and length of the lever arms being matched to enable movement of said flyweight means upon reaching of a predetermined rotational speed at which the transmitted relative rotational speed is to be adjusted.

3. A drive according to claim 2, comprising a fan and characterized in that the fan is operable to be driven by said regulatable V-belt drive means.

4. A drive according to claim 2, characterized in that the length of the lever arms and spring applied force are selected such that a first of said partial load ranges of the regulation becomes effective approximately at one-third of the maximum crankshaft rotational speed while a second of said partial load ranges of the regulation becomes effective approximately at two-thirds of the maximum crankshaft rotational speed.

5. A drive according to claim 4, characterized in that said V-belt drive means includes means for adjusting the transmission ratio in said first partial load range of the regulation with a speed-up to said substantially constant transmission ratio, said substantially constant transmission ratio being about 1:1, and in said second partial load range of the regulation from the transmission of about 1:1 with said speed reduction and decreasing output speed.

6. A drive according to claim 2, characterized in that the flyweight means comprises a plurality of flyweights and a respective pivot axis about with the flyweights are movable, wherein said flyweights act on an adjustable V-belt pulley means of said V-belt drive means by separate transmission means against said spring force, and in that in the connection between each flyweight and its coordinated transmission means is effective at first a smaller distance and then a larger distance from the flyweight pivot axis.

7. A drive according to claim 6, characterized by a stub shaft fixed to the end of the crankshaft which receives a V-belt pulley means of the V-belt drive means, said pulley means being mounted so as to prevent rotation and axial movement thereof relative to said stub shaft, and wherein said stub shaft carries additionally said adjustable V-belt pulley means on a displacement sleeve.

8. A drive according to claim 7, characterized in that the adjustable pulley means has a hub portion which is constructed as a housing which accommodates said spring means, which in turn is supported at an offset of the stub shaft and, on the other hand, is supported internally at a bottom of the hub portion.

9. A drive according to claim 8, characterized in that the connections of each of said flyweights comprises two drag connection means, the transmission means being pivotally connected in its turn externally at the bottom of the hub portion, and in that initially for a first of said partial ranges of the regulation, a first drag connection means of said two drag connection means together with the coordinated spring means applied force produces a small torque which is readily overcome by the centrifugal force interaction whereas a second drag connection means of said two drag connection means together with the associated spring means applied force produces a larger torque which can be overcome only with considerably greater difficulty by the centrifugal force interaction.

10. A drive according to claim 9, characterized in that a transversely disposed pivot shaft is arranged in said stub shaft, which receives two of said flyweights, including, fork-like, said transmission means that is pivotally connected externally at the bottom of the hub portion of the adjustable pulley means.

11. A drive according to claim 10 characterized in that each of said flyweights consists of two identical parts which are installed mirror-image-like with respect to each other on both sides of the transmission means.

12. A drive according to claim 11, characterized in that each of said two identical parts includes a first part which abuts substantially at the stub shaft and a second part which is located spaced from the stub shaft, and in that both flyweights are installed as a whole rotated by 180° with respect to each other.

13. A drive according to claim 2, characterized in that the flyweight means, lever arms and spring means form means for adjusting the transmission ratio in a first of said partial load ranges of the regulation with a speed-up to said substantially constant transmission, said substantially constant transmission ratio being about 1:1, and in a second of said partial load ranges of the regulation from the transmission ratio of about 1:1 with said speed reduction and decreasing output speed.

14. A drive according to claim 1, comprising flyweight means including a plurality of flyweights and a respective pivot axis about which the flyweights are movable, spring means mounted to apply a force in opposition to movement of said flyweight means wherein said flyweights act on an adjustable V-belt pulley means of said V-belt drive means by separate transmission means against said spring force, and wherein a connection is formed between each of said flyweights and its coordinated transmission means which is effective at first a smaller distance and then a larger distance from the flyweight pivot axis.

15. A drive according to claim 14, characterized by a stub shaft fixed to the end of the crankshaft which receives a V-belt pulley means of the V-belt drive means, said V-belt pulley means being mounted so as to prevent rotation and axial movement thereof relative to said stub shaft and wherein said stub shaft carries additionally said adjustable V-belt pulley means on a displacement sleeve.

16. A drive according to claim 15, characterized in that the adjustable pulley means has a hub portion which is constructed as a housing which accommodates said spring means, which in its turn is supported at an offset of the stub shaft and, on the other hand, is supported internally at a bottom of the hub portion.

17. A drive according to claim 16, characterized in that the connection of each of said flyweights comprises two drag connection means, the transmission means being pivotally connected in its turn externally at the bottom of the hub portion, and in that initially for a first of said partial ranges of the regulation, a first of said two drag connection means together with the coordinated spring means applied force produces a small torque which is readily overcome by the centrifugal force interaction whereas a second of said two drag connection means together with the associated spring means applied force produces a larger torque which can overcome only with considerably greater difficulty by the centrifugal force interaction.

18. A drive according to claim 15, characterized in that the adjustable pulley means has a hub portion, and in that a transversely disposed pivot shaft is arranged in said stub shaft, which receives two of said flyweights, each of said flyweights including, fork-like, said transmission means that is pivotally connected externally at the bottom of the hub portion of the adjustable pulley means.

19. A drive according to claim 18, characterized in that each of said flyweights consists of two identical parts which are installed mirror-image-like with respect to each other on both sides of the transmission means.

20. A drive according to claim 19, characterized in that each of said two identical parts includes a first part which abuts substantially at the stub shaft and whose second part is located spaced from the stub shaft, and in that both flyweight means are installed as a whole rotated by 180° with respect to each other.

* * * * *